Aug. 25, 1970  H. ZIRNGIBL ET AL.  3,525,595
CONCENTRIC CROSS-FLOW NOZZLE APPARATUS FOR CARRYING OUT
REACTIONS BETWEEN GASES

Filed May 14, 1968  2 Sheets-Sheet 1

INVENTORS:
HANS ZIRNGIBL, WALTER GUTSCHE, KLAUS WAUSCHKUHN, WALTER WEIDMANN.

BY
Burgess, Dinklage & Sprung
ATTORNEYS

INVENTORS:
HANS ZIRNGIBL, WALTER GUTSCHE, KLAUS WAUSCHKUHN, WALTER WEIDMANN.
BY
Burgess, Dinklage & Sprung
ATTORNEYS 3,525,595
CONCENTRIC CROSS FLOW NOZZLE APPARATUS FOR CARRYING OUT REACTIONS BETWEEN GASES
Hans Zirngibl, Duisburg, Walter Gutsche, Krefeld, Klaus Wauschkuhn, Krefeld-Bockum, and Walter Weidmann, Duisburg-Mundelheim, Germany, assignors to Farbenfabriken Bayer Aktiengesellschaft, Leverkusen, Germany, a corporation of Germany
Filed May 14, 1968, Ser. No. 729,057
Claims priority, application Germany, May 19, 1967, F 52,455
Int. Cl. B01j 1/14; C01g 23/04
U.S. Cl. 23—284         1 Claim

ABSTRACT OF THE DISCLOSURE

Mixing and reaction apparatus for carrying out reactions between gases, in particular for the production of solids such as e.g. pigments and fillers from inorganic halides with oxygen or ammonia containing gases whereby the corresponding oxides or nitrides are obtained in finely divided form, the gaseous reactants being mixed by the cross-flow principle in an elongated reactor comprising a mixing- and reaction zone and a cooling zone wherein at least one of the gaseous reactants is introduced centrally at one end of said mixing- and reaction zone and the other other reactant is introduced via a distributor at an angle of about 90° to the other reactant fed in centrally. The distributor comprises an annular distribution chamber with a gas inlet and a gas outlet, e.g. nozzle, and a barrier interposed between said distribution chamber and the gas outlet, the gas outlet being surrounded by separate gas outlets for inert gases, e.g. nitrogen, chlorine, carbon monoxide, carbon tetrachloride or mixtures thereof.

---

Figure 1:
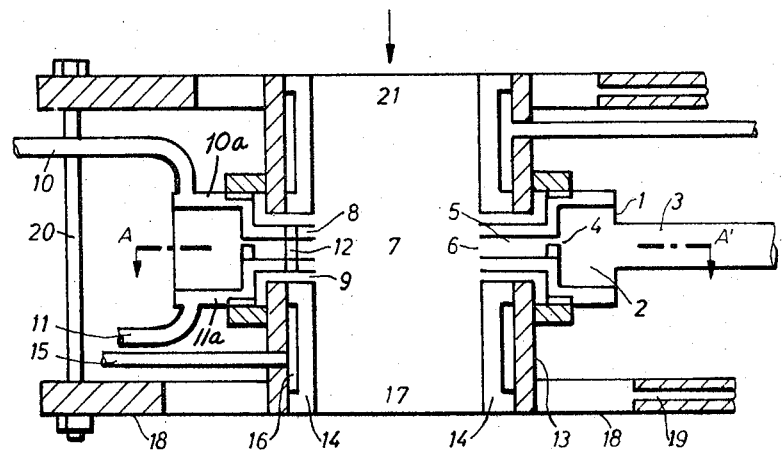

This invention relates to a method of and an apparatus for carrying out reactions between gases or vapours, preferably for the production of solids such as pigments or fillers.

Gases can be mixed or reacted by several processes, many of which operate with burners consisting of coaxial tubes or channels. In systems of this kind, however, the reactants are only mixed along the marginal zones of the gas streams in an amount that is governed by the rate at which the adjacent gas streams absorb one another as it were along their marginal zones. The result of this is that mixing is retarded so that the reaction zone covers a wide area and both the temperatures in the reaction zone and the residence time of the compounds already formed in the high temperature range are subject to considerable variations.

In the production of solids by the reaction of gaseous or vapourous reactants at elevated temperatures, it is very often essential that particles are produced which have uniform, precisely defined size. In carrying out the reaction, therefore, it is of considerable importance that the reactants are mixed as quickly as possible under precisely controlled conditions because only in this way is it possible to establish uniform reaction conditions.

According to other proposals, the components can be mixed more quickly and with greater control by adopting the transverse flow or cross-flow principle.

The production of finely divided solids always involves the danger of potentially very harmful deposits formed, in particular at, or around, the inlet openings for the metal or semi-metal compounds. According to various proposals, an inert gas screen or film is arranged between the gas streams of the various components. Although, in this case, the danger of deposits is reduced, mixing of the reactants is retarded to an even greater extent in view of the parallel current principle applied. It has now been found that, in cross-flow mixing, inert gas screens of this kind influence mixing to a far lesser extent and have no undesired effect either on particle size or on particle size distribution.

Accordingly, the present invention relates to a process in which the components are mixed on the cross-flow principle in which the flow stream of one component is simultaneously surrounded by an inert gas stream.

According to the invention, at least one of the reactants, optionally after it has been suitably pre-heated, is inserted into a distributor preferably made of metal comprising an annular duct or channel, a barrier provided with slots for the uniform distribution of the gas and, finally, an annular gap or alternatively nozzles radiating from the annular duct for introducing the gas into the mixing zone. In the mixing and reaction zone, the uniform gas stream (where there is an annular gap) or the gas streams (where nozzles are used) meet the second gaseous component, which is introduced vertically from above and which may also be pre-heated, at an angle of, or close to, 90°.

The components may be pre-heated in any way, for example, by conventional means in the form of heat exchangers or heating elements; an auxiliary gas may be burnt in a preceding combustion chamber; alternatively, it is possible to use electrical systems such as resistance beds, arcs, plasma burners or high-frequency induction heating.

The process according to the invention is particularly suitable for producing finely divided solids controlled both in shape and size from gaseous components. It is possible in this way to produce inter alia oxidic compounds, in particular in a pigment-fine distribution, and also nitrides or carbides, for example. For the production of oxides, the vaporized metal compound (suitable metal compounds include the halides and, in particular, the chlorides of the elements: Titanium, silicon, aluminium, zirconium, iron, zinc, boron, germanium and the elements of the V-A- or V-B-group of the Periodic System (Chemiker-Kalender 1956, Springer Verlag, p. 2)) is preferably introduced through the aforementioned distributor whilst the oxidizing gas stream is introduced centrally from above into the mixing and reaction zone, referred to hereinafter as the mixing chamber.

So far as the production of solids is concerned, the process is not limited to the use of pure gases as it is also possible to use gas mixtures in order to obtain mixed compounds such as, for example, mixed nitrides, carbides, oxides or mixed-phase compounds such as mixed-phase pigments.

In order to prevent deposits of finely divided solids, the gases flowing in through the distributor may be surrounded by an inert gas screen. As already mentioned earlier on, it has been found that, in cross-flow mixing, the use of an inert gas stream has little or no effect on the mixing process, nor does it influence the product either in its particle size or in its particle size distribution. In cases where an annular gap is used as the inlet opening for one of the components, therefore, an additional annular gap or additional annular gaps under the influence of an inert gas are provided in the distributor beneath, and optionally above, the halide inlet. In cases where nozzles are used as inlets for one of the components, a concentric tube through which the inert gas is blown is arranged around each of the inlet openings.

Suitable inert gases include gases that do not take part in the reaction under the reaction conditions such as, for example, nitrogen, oxygen and chlorine optionally in admixture with carbon monoxide or carbon tetrachloride.

However, the danger of deposit formation exists not only at the inlet opening or inlet openings for one of the components, but also immediately beneath it and, in the event of reactive turbulence, above it, too. For this reason, porous materials which are also rinsed with inert gas are used for the walls of the mixing chamber both below and above the gap or nozzle.

The mixing chamber into which the gases are laterally introduced consists of two metal cylinders with the distributor in between. Each metal cylinder, which carries a flange at one end, is internally lined with a porous material in such a way that a diffusion zone for the inert gas is left between the porous material and the metal cylinder from which the inert gas is forced through the porous walls. Although metals, for example, nickel, may be used as the porous material, it is also possible with advantage to use graphite. Graphite is cemented to the metal wall at the end faces in question. If desired, both materials may also be additionally provided with screw threads and screwed into one another. It has proved to be particularly effective to join the porous graphite portion to one rear wall of impervious graphite in such a way as to leave free a sufficiently large annular space for the diffusion of the rinsing gas, and to fit the impervious graphite portion tightly optionally with the aid of screw threads, in the metal cylinder.

In order particularly effectively to seal the end faces, it is of advantage to electrolytically deposit metal onto the metal wall and the graphite, for which purpose the metal is preferably deposited from the metal of which the metal cylinder is made, for example, nickel. It is of advantage to cool the flanges in order to protect the cementing. The distributor plate containing the inlet openings for one of the components is arranged between the two metal cylinders, the three elements being held together with screws by way of the flanges.

The mixing chambers are adjoined by the actual reaction tube or a residence chamber. If the diameter of the reaction tube is larger than the diameter of the mixing chamber, the transition between them may be conical in design, thus avoiding edges and corners which would only impair gas flow.

Figure 2:
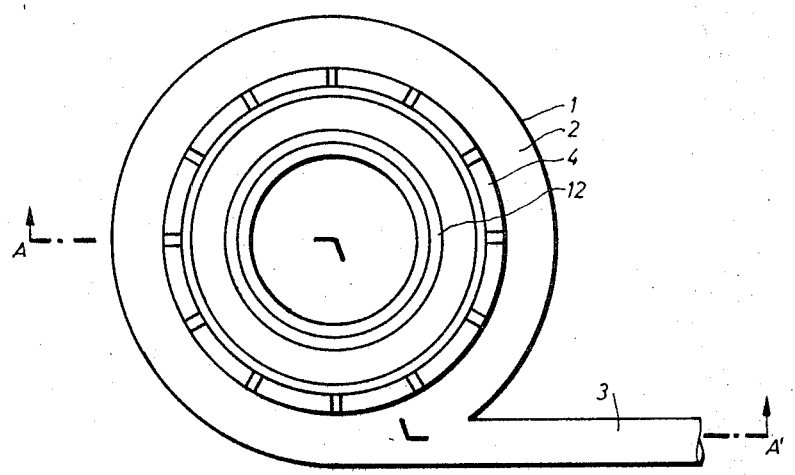
Figure 3:
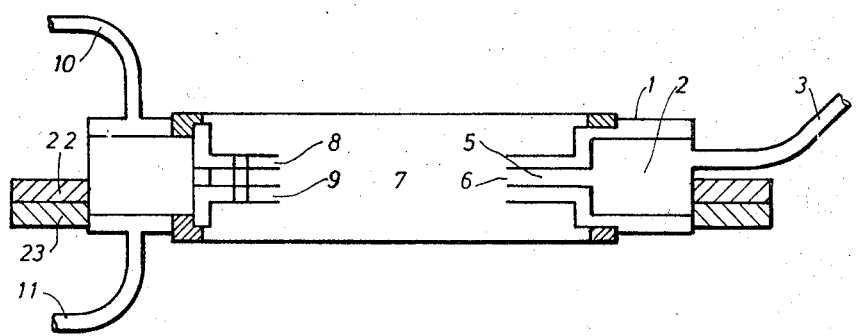
Figure 4:
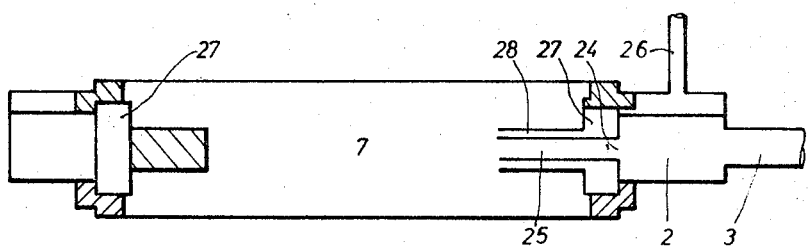

The mixing chamber is shown in FIGS. 1 to 5. FIG. 1 is a horizontal section through the mixing chamber as a whole. This mixing chamber is adjoined at one end by the actual reaction tube or the residence tube, and at its other end by the feed system for the axially introduced reactant. FIG. 2 is a section through the distributor. FIG. 3 shows a split distributor with annular slots. FIG. 4 shows a distributor with nozzles as the inlets, and FIG. 5 a modified distributor according to FIG. 1 with a second barrier 29 before the outlet nozzles.

FIG. 1: The distributor 1 is centrally located. It is provided externally with an annular peripheral distributor conduit or distribution chamber 2 into which the component to be reacted is radially or tangentially introduced through the feed pipe 3. The compound flows through the slot thereat containing the barrier 4 with its plurality of openings into the peripheral cross-flow gas feed means in the form of annular gap 5 formed between the adjacent annular feed walls thereat and enters the mixing zone 7 at a point 6. Above and beneath the inlet for the reactants there are further or supplemental cross-flow gas feed means in the form of annular gaps 8 and 9 formed between the adjacent annular walls thereat through which chlorine or any other gas inert with respect to the reaction is introduced. This gap is supplied through the pipes 10 and 11 to the corresponding supplemental distribution conduit or diffusion zones 10a and 11a. Spacer members 12 may be incorporated in all the annular gaps.

Above and beneath the distributor there are identical components so that it will be quite sufficient to describe one part only. It consists of a metal cylinder 13 which is lined internally with a porous material 14. The inert gas is forced into the annular space 16 through a pipe 15 and then flows through the pores in the wall 14 into a reaction zone 17. At one end, the metal cylinder carries a flange 18 which can be cooled, the coolant used flowing in and out through the flow paths on passages 19. The mixing chamber is held together by tension screws 20. The hot, oxidising gas flows in at 21.

FIG. 2 is a section through the chamber shown in FIG. 1 in the plane AA', and shows the diffusion zone 2, the barrier 4, the spacer members 12 and the feed pipe 3, which in this case, has been drawn tangentially.

FIG. 3 shows a distributor with an annular gap of the kind used in the mixing chamber shown in FIG. 1. However the distributor shown in FIG. 3 is separable, being held together by the flanges 22 and 23. It is also possible by virtue of the split distributor to assemble with only a few components a whole number of distributors with various heights for the annular gap.

FIG. 4 is a section through the nozzle plate. There is no change either in the peripheral distributor conduit or diffusion zone 2, i.e. in the form of an annular peripheral conduit or in the feed system 3 from which the reactant flows through passages 24 into the individual nozzles which open radially into the mixing zone 7.

Inert gas enters the distributor at a point 26, flows into its own supplemental distributor conduit or diffusion zone 27, i.e. in the form of an annular supplemental conduit and then into the annular spaces or supplemental nozzles 28 surrounding concentrically the main nozzles 25. From there, the inert gas also flows into the mixing zone and in doing so completely surrounds the gas stream of the reactant issuing through the nozzles.

Basically, any one of a number of readily available metals may be used as the material for the distributor, such as, for example, iron, steel, titanium thermax, nickel and many others, although other materials, for example ceramics, may also be used. The choice of the most suitable material will be determined in each case by the reaction media and by the temperature. Surprisingly, it has been found that nickel shows little or no deterioration in the presence of chlorine and even hot oxygen so that nickel may be used as the material for reactions between metal or metalloid halides and oxygen at elevated temperatures.

Figure 5:
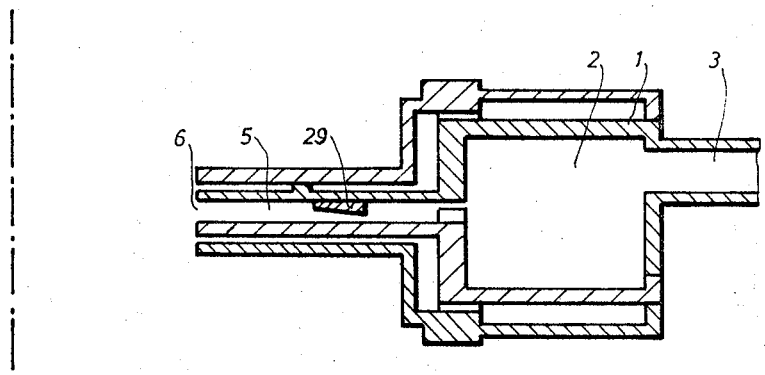

Depending upon the rates of gas flow and the pressure conditions in the distributor the distribution of gas in cases where an annular gap is used may not always be entirely uniform in the gap itself and at the inlet into the mixing zone (5 and 6 in FIG. 1) despite both the diffusion zone and the presence of a slotted barrier, promoting "strand" formation which can lead to reactive turbulence and hence to the deposition of material in the gap itself. This difficulty can be avoided by providing an additional barrier or ring 29 which breaks up the streams behind (i.e. upstream of) the slots in the first-mentioned barrier (looking in the direction of gas flow). This modification is shown in FIG. 5.

The effectiveness of mixing is governed both by the impulses of the individual gas streams and by their impulse ratio. In this context, the impulse ratio is the ratio of the impulse generated by the gas flowing in through the nozzles or the annular gap to the impulse generated by the gas flowing vertically from above. The impulse of the gas issuing from the nozzles or from the annular gap is always intended to be larger than that of the gas flowing centrally from above. In other words, the impulse ratio is intended to be higher than 1 and preferably greater than 2. However, it may even be much greater than this, for example, up to 50 and preferably up to 40.

As outlined above the process of invention is suitable for the production of fillers normally produced by steam hydrolysis, and for the production of pigments normally produced by combustion. Broadly speaking, any metal halides and especially the chlorides which can be volatilized and which form solid reaction products, especially solid metal oxides or nitrides under the process conditions may be used.

Due to the high gas velocities the metal halide formed during the reaction is entrained rapidly out of the reaction zone together with the halogen formed. In the tube following the mixing and reaction zone the metal oxide suspended in the reaction gases is cooled, e.g. by introduction of recycled reaction gas to temperatures of between 600 and 800° C. in order to avoid further particle growth.

The reaction mixture leaving the reactor is chilled, e.g. by the addition of water, and thereafter the metal oxide is separated from the reaction gases. The metal oxide is then aftertreated as known per se in the art, e.g. by removing the entrained halogen and/or hydrogen halogenide impurities and drying. Frequently, the metal oxides if to be used as pigments or fillers are aftertreated with inorganic or organic agents to improve their properties with regard to dispersibility, light stability and the like.

Otherwise the oxygen either alone or together with an inert gas can be preheated in an electric arc burner, preferably a tangentially blown high voltage arc burner. In order to achieve a uniform temperature level the preheated gas is then introduced via a pre-mixing chamber into the reaction zone. In such cases where the oxygen or the oxygen-inert gas mixture is preheated to temperatures of more than 2000° C. relatively cold gas is admixed in the preheating chamber in order to obtain a gas mixture having a temperature of at least just below 2000° C., optionally of between 1200 and 1900 ° C.

Various types of preheated means and procedures, especially high voltage arc burner preheating, and inorganic halide oxidations to produce fillers, pigments etc. are disclosed in co-pending U.S. applications which are incorporated herein by way of reference: Ser. No. 682,720, filed Oct. 31, 1967, which is a streamlined continuation of Ser. No. 361,357, filed Apr. 21, 1964 and now abandoned: Ser. No. 536,728, filed Mar. 23, 1966; Ser. No. 686,247, filed Nov. 28, 1967; and Ser. No. 693,478, filed Dec. 26, 1967.

The present invention is distinguished from these prior developments described above by the specific means used to mix the reactants in the mixing- and reaction chamber, achieving more efficiently or uniform particle size, specific crystallinity and other desired properties of the solid reaction products.

EXAMPLE 1

Titanium tetrachloride was reacted to form the oxide in an apparatus of the kind shown in FIG. 1. 70 litres of liquid titanium tetrachloride were evaporated in a heat exchanger and then heated to 500° C. It is possible by heating $TiCl_4$ to at the most 500° C. to make both the reactors and the pipes out of nickel.

The titanium tetrachloride entered the distributor at a point 3, was distributed in the distribution zone 2, traversed the barrier 4 through a plurality of slots and then flowed through the annular gap 5 into the mixing chamber 7.

Oxygen in a ratio of 1.25:1, based on the $TiCl_4$, was pre-heated to 700° C. and the gas was further heated by burning a fuel in this stream of oxygen, introduced into the mixing chamber at point 21 and mixed with the stream of titanium chloride at a point 7. The stream of oxygen was heated to such an extent that a temperature of 1030° C. was calculated for the mixture of the reaction gases, not allowing for the heat of reaction.

1 Nm.³/hour of chlorine was introduced through the feed pipes 10 and 11, flowing into the mixing chamber through the annular gaps 8 and 9.

During the test, the porous walls 14 were rinsed with chlorine which was forced through the walls from the annular zone 16.

Before entering the superheater, the $TiCl_4$ vapour had aluminium chloride vapour mixed with it in such a quantity that the product contained 1% by weight of $Al_2O_3$.

The concentration of $TiCl_4$ in the reaction mixture amounted to 28% by volume.

The product obtained was $TiO_2$-rutile in pigment-fine distribution. The pigment properties were extremely good. Thus, the brightening power amounted to 865 units, as measured in accordance with DIN 53 192, whilst the Reynolds number was 1800. The most common particle size was approximately $0.24\mu$ in a narrow particle size distribution. The pigment had an outstanding covering power and an extremely high degree of whiteness.

EXAMPLE 2

On this occasion, a mixing chamber with nozzles of the kind shown in FIG. 4 was used.

Titanium tetrachloride was vaporised at a rate of 41 litres per hour, and heated to around 500° C. by resistance heating in an apparatus. Aluminium chloride vapour was then mixed with it in such a quantity that the $TiO_2$ produced contained around 1% by weight of $Al_2O_3$. The $TiCl_4/AlCl_3$ mixture entered the distribution zone 2 and 3 and flowed into the mixing chamber 7 through the nozzles 25. The temperature measured in the diffusion zone was 455° C. The outflow rate from the nozzles amounted to 9.1 m. per second. Cold chlorine was introduced at 26, being distributed through the annular zone 27, and also flowed into the mixing chamber through the coaxial annular zone 28. The inflow rate amounted to 4 metres per second. The stream of halide gas was then surrounded by a jacket of chlorine gas, thus preventing a reaction at the nozzle opening.

The oxidising gas entered the mixing zone 1 vertically from above. It consisted of oxygen used in a 30% stoichiometric excess, and 4 Nm.³/hour of nitrogen.

The oxidising gas was heated by means of a plasma burner to such a temperature that the temperature of the gas mixture as a whole in the mixing zone amounted to approximately 990° C.

Chlorine flowed through the porous walls of the mixing chamber at a rate of 4 N$m$.³/hour.

The titanium dioxide produced in this way consisted of rutile in pigment-fine distribution and with excellent optical properties. Its brightening power according to DIN amounted to 830, and its brightening power according to Reynolds to 1750. The product was soft and extremely easy to grind. The most common particle diameter among the primary particles was 0.234. The particle size distribution was relatively narrow. The pigment had an excellent covering power and a high degree of whiteness.

EXAMPLE 3

An apparatus of the kind shown in FIG. 3 was used. The free diameter of the mixing zone 7 at the level of the annular gap 5 amount to 50 mm. The annular gap 5 was 1 mm. deep.

Titanium tetrachloride was vaporized at a rate of 10 litres per hour and heated to approximately 500° C. by means of electrical resistance heating. The halide was introduced into the apparatus through the pipe 3, being distributed in the annular zone 2, and entered the mixing chamber 7 through the annular gap 5 at 6. The temperature of the halide was 470° C. in the zone 2. Accordingly, the inflow rate at 6 amounted to approximately 9.7 m. per second.

Ammonia used in a 100% stiochiometric excess in accordance with the formula:

$$3TiCl_4 + 4NH_3 \rightarrow 3TiN + 12HCl + \tfrac{1}{2}N_2$$

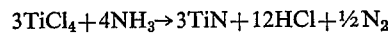

was mixed with 1.5 Nm.³/h. of nitrogen superheated in a plasma burner, and the resulting mixture was introduced centrally from above into the mixing chamber 7 at a rate of about 6 m. per second. So much heat was introduced into the system by the plasma burner that the reaction gas mixture had a temperature of 1050° C.

Nitrogen as the protective gas or inert gas was introduced through the pipes 10 and 11. Nitrogen was also forced in through the porous walls of the mixing chamber. The reactor following the mixing chamber was kept at a temperature of at least 220° C. in order to avoid the deposition of NH₄Cl formed.

The titanium nitride formed was collected and then washed. 3.83 kg. of TiN per hour were obtained, corresponding to a 68% conversion of TiCl₄.

What is claimed is:

1. Apparatus for carrying out reactions between gaseous reactants for the production of reaction products in the form of finely divided solids, which comprises a longitudinal mixing and reaction chamber having a corresponding longitudinal peripherally confining interior wall at least a portion of which is gas porous for introduction of inert gas therethrough, a longitudinal gas inlet for introduction of a first reacting gas axially at one end portion thereof and a longitudinal product outlet for discharge of the produced solids at the other end portion thereof, means defining a peripheral distributor outwardly enclosing a portion of said wall intermediate said inlet and said outlet, said distributor including an annular peripheral distributor conduit for a second reacting gas and medially directed peripheral cross-flow gas feed means in the form of a plurality of spaced apart radially inwardly directed main nozzles substantially in a common plane extending transversely to the longitudinal axis of said chamber, said main nozzles flow communicating said peripheral conduit with said chamber interior at such intermediate wall portion to feed said second gas crosswise of the longitudinal flow of said first gas, said peripheral feed means in the form of said main nozzles each having means defining a barrier disposed across a portion of the flow cross-section thereof to define therewith a gas permeable gap, and means defining an annular supplemental distributor conduit for inert screening gas disposed axially adjacent said peripheral conduit and medially directed supplemental cross-flow gas feed means in the form of a corresponding plurality of supplemental nozzles concentrically surrounding said main nozzles such that said main nozzles and said supplemental nozzles terminates substantially at the same radially inward point, said supplemental nozzles flow communicating said supplemental conduit with said chamber interior to feed an inert gas screen crosswise of said longitudinal flow of gas adjacent the point of crosswise flow feed of said second gas to screen said second gas as it is fed into said chamber.

References Cited

UNITED STATES PATENTS

| 2,908,631 | 10/1959 | Allen | 23—277 XR |
| 2,915,367 | 12/1959 | Olson et al. | 23—277 XR |
| 2,957,753 | 10/1960 | Nelson et al. | 23—277 XR |
| 3,101,249 | 8/1963 | Priscu. | |
| 3,311,451 | 3/1967 | Biegler et al. | 23—277 XR |
| 3,403,001 | 9/1968 | Mas e al. | 23—277 XR |
| 3,275,411 | 9/1966 | Freeman et al. | 23—140 X |
| 3,275,412 | 9/1966 | Skrivan | 23—140 X |
| 3,306,760 | 2/1967 | Zirngibl et al. | |
| 3,343,911 | 9/1967 | Eisenlohr. | |
| 3,361,525 | 1/1968 | De Rycke et al. | 23—140 |

FOREIGN PATENTS 624,372  2/1963  Belgium.

MORRIS O. WOLK, Primary Examiner

B. S. RICHMAN, Assistant Examiner

U.S. Cl. X.R.

23—140, 145, 182, 200, 202, 277